No. 12,136. REISSUED JULY 28, 1903.
H. W. McCOMBS.
STEAM CYLINDER DRAIN VALVE.
APPLICATION FILED JAN. 9, 1903.
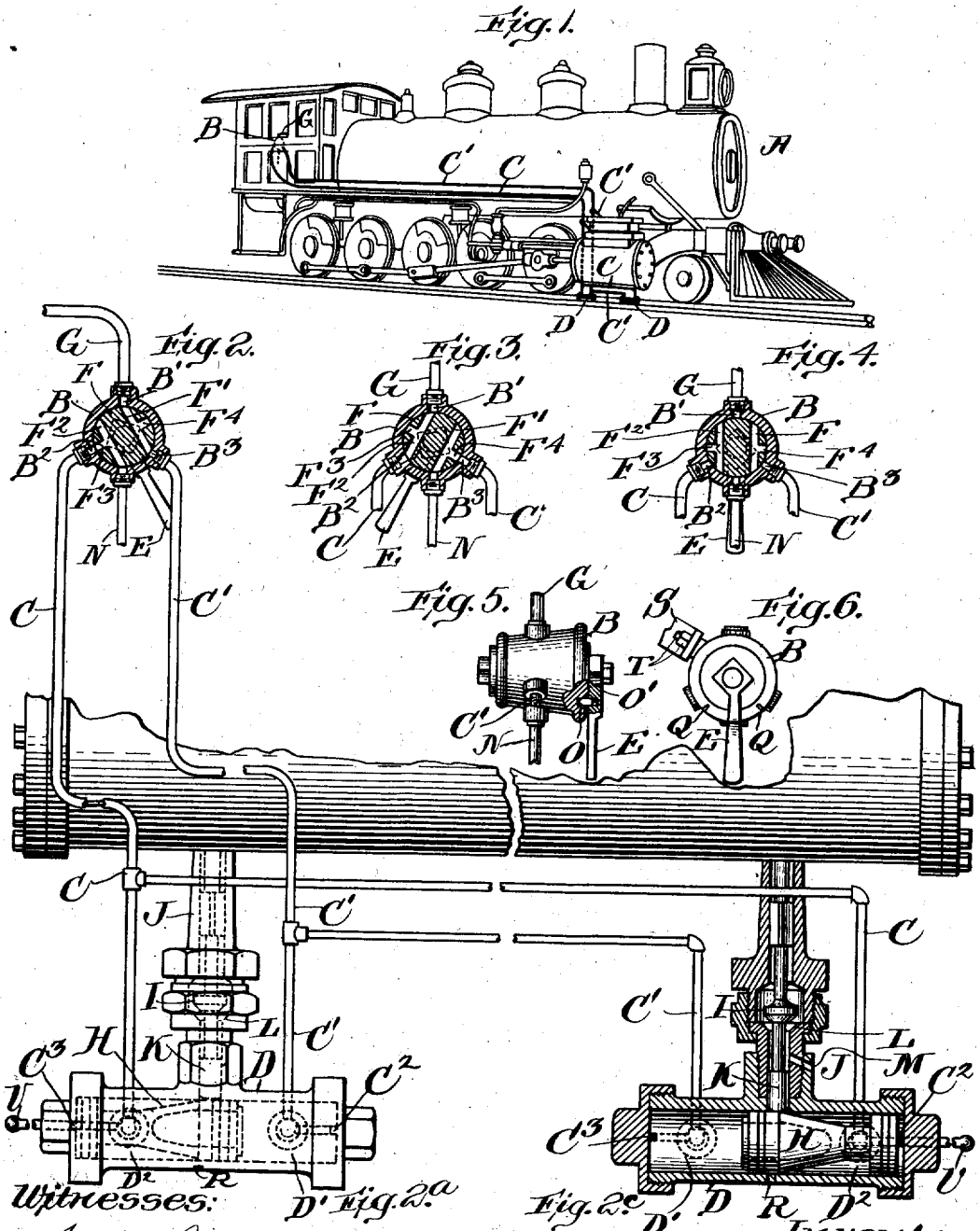
Witnesses:
Anton T. Randall,
Joseph T. Brennan
Inventor:
Henry W. McCombs,
by Roberts & Litchfield
Attorneys.

No. 12,136. Reissued July 28, 1903.

UNITED STATES PATENT OFFICE.

HENRY W. McCOMBS, OF BOSTON, MASSACHUSETTS.

STEAM-CYLINDER DRAIN-VALVE.

SPECIFICATION forming part of Reissued Letters Patent No. 12,136, dated July 28, 1903.

Original No. 651,878, dated June 19, 1900. Application for reissue filed January 9, 1903. Serial No. 138,440.

*To all whom it may concern:*

Be it known that I, HENRY W. McCOMBS, a citizen of the United States of America, and a resident of Boston, in the county of Suffolk and Commonwealth of Massachusetts, have invented certain new and useful Improvements in Steam-Cylinder Drain-Valves, of which the following is a specification.

My invention relates to improvements in apparatus used in draining the cylinders of locomotives, stationary and marine engines, and in other allied uses where it becomes necessary to liberate the moisture from the cylinders.

The objects of my invention are to effectually and quickly empty the cylinders of the condensed steam through the employment of improved drain-valves actuated by steam or compressed air through pipes communicating therewith and whose action is governed by a supply-cock located in the cab or engine-room, where it can be manually operated by the engineer. I attain these objects by the mechanism illustrated in the accompanying drawings, in which—

Figure 1 represents in perspective a locomotive equipped with my improved apparatus. Fig. 2 designates the engineer's valve in transverse central section governing the supply of steam or air to the cylinders in a position to open the steam-cylinder cocks, Fig. 3 being a similar view, but with the steam or air ducts in reversed position to close said cylinder-cocks. Fig. 4 is also a like view with the ducts in normal position and the ports closed. Fig. 5 is a side elevation of the four-way supply-cock and its connections. Fig. 6 illustrates a front elevation of the same to exhibit the method of prescribing the movements of the operating-lever, Fig. $2^a$ being a side elevation or external view of one of the supplemental cylinders and Fig. $2^c$ a similar position of a like valve in longitudinal section with the ordinary cylinder-cocks in vertical central section supporting said cylinders, each of the latter views being supplementary and forming a part of Fig. 2.

Corresponding letters of reference designate like features throughout the several views, referring to which—

A represents a locomotive, in the cab of which is located the engineer's four-way valve, placed in any convenient position, as at B. Steam or air pipes C C′ connect said valve with the supplemental cylinders D D, situated at the lower line of each of the steam-cylinders. The function of the several parts, with their construction, will appear in the further description, commencing with Fig. 2 herein. The situation of the lever E indicates the open position of the valve I in the drain-cocks J, the plug F being semirotated from its normal position, Fig. 4, so that the lower end of its transverse duct F′ communicates with the pipes C′ and its upper end with the port B′, communicating with the pipe G, leading from the steam or air supply, accessibly situated in the locomotive-cab or in the engine-room, and which is conveyed to the cylinders D D through said pipe C′ and duct $C^2$, entering the cylinder ends D′ D′ simultaneously, actuating longitudinally the sliding-tapered or wedge-shaped pistons H H in a direction to open the valves I of the drain-cocks J J in the position shown in Fig. $2^c$. Obviously any series of pistons H are in like manner actuated; but for the purpose of this description I confine myself to the duplicate arrangement of cylinders D and pistons H illustrated.

Should the operating (hand) lever E of the valve B be reversed to the position shown in Fig. 3, then its transverse duct $F^2$ is rotated to a position establishing communication from the steam or air supply through the pipe G, port B′, to port $B^2$, to pipes C, duct $C^8$, and cylinder ends $D^2$ $D^2$, such action simultaneously reversing the former position of the sliding taper pistons H H, and thus closes the valves I I of the drain-cocks J. The open position of said valves is well observed in Fig. $2^c$. Here the valve-stem K is raised by the piston H, lifting the valve I from its seat L and opening the drain-cock J, permitting the condensation to escape from the steam-cylinders through the drain-vents M M. Drip-vents R R serve to keep the cylinders D D free from any moisture that may tend to collect therein.

Reverting again to Fig. 2, the position of the radial port $F^3$ opens into the port $B^2$ and into the pipes C C in such position that the surplus of the steam or air which actuated the pistons H H, if any, remains in the cylinder-chambers $D^2$, returns by the pipes C C, and escapes through the transverse port $B^2$ in the direction of the arrow 2 and through the exhaust-pipe N to the outer air. The reversed position of said plug F, as in Fig. 3, obviously exhausts any latent steam or air from the opposite ends of the cylinder-chambers D′, in a like manner returning through the pipes C′, port $B^3$, radial port $F^4$, and transverse port F′ to the exhaust N and out again.

A bracket S, attached to any convenient part of the boiler inside the cab, supports the valve B through the medium of the stud and nut T, as in Fig. 6.

To change the position of the pistons H H independently of steam or air pressure, they may be manually actuated by the handles U U, properly packed through the ends of the cylinders D D, the ends of said handles being secured to the ends of the said pistons.

To secure the lever E from accidental displacement, a spring-actuated pin O, Figs. 5 and 6, is inserted in the inner side of the lever-shank O′, which falls into a recess P in the face of the valve B, (when in its normal position,) while the spurs or ribs Q Q prescribe the swing of the lever E within the radius of its proper action.

The normal position of the valve B when the train is in motion is as exhibited in Fig. 4, the aforesaid manipulation of the same being only necessary when it is desired to empty or drain the steam-cylinders of the condensed steam.

My improved device accomplishes the purpose for which it is designed expeditiously and efficiently and insures greater economy and convenience when repairs are necessary than in similar devices at present in use, and while I have illustrated the preferred method of constructing my invention I desire not to be confined to the strict interpretation thereof as herein set forth, but may employ such equivalents therefor as would come within the fair scope and spirit of my invention, which, briefly stated, consists in providing, in connection with a cylinder drain-cock, a valve-operating device or motor actuated by fluid-pressure, a conduit connecting said device with a supply of fluid under pressure, and a valve in that conduit for controlling the passage of fluid under pressure through said conduit.

What I claim is—

1. The combination with the cylinder drain-cock of a locomotive, of a drain-cock-operating device actuated by fluid-pressure; normally closed conduits for connecting said device with a supply of fluid under pressure, and means accessible to the engineer from within the cab for connecting either of said conduits with the supply to the exclusion of the other conduit, and for closing both conduits at once.

2. The combination with the cylinder drain-cock of a locomotive, of a drain-cock-operating device actuated by fluid-pressure; a pair of normally closed conduits for connecting said device with a supply of fluid under pressure, and a duplex valve normally occupying a neutral closed position and accessible to the engineer from within the cab by which either conduit is opened to the supply, and the other to exhaust, or both conduits closed to supply.

3. The combination with the cylinder drain-cock of a locomotive, of a drain-cock-operating device actuated by fluid-pressure, a pair of conduits connecting said device with a supply of fluid under pressure, and a valve normally occupying a closed neutral position and accessible to the engineer for controlling said conduits adapted to occupy three positions, viz., with both conduits closed when in normal position, with one conduit open to the supply of fluid-pressure to the exclusion of the other when in another position, and with the other conduit open to the supply of fluid under pressure to the exclusion of the first when in its third position.

4. The combination with the cylinder drain-cock of a locomotive; of a drain-cock-operating device actuated by fluid-pressure; a pair of conduits connecting said device with a supply of fluid under pressure; and a valve normally occupying a closed neutral position and accessible to the engineer for controlling said conduits adapted to occupy three positions, viz., with both conduits closed when in normal position, with one conduit open to the supply of fluid-pressure and the other open to exhaust when in another position, and with the first conduit open to exhaust and the other conduit open to the supply of fluid-pressure when in its third position.

5. The combination with the cylinder drain-cock of a locomotive, of a supplemental cylinder; a piston in said cylinder normally in a state of pressure equilibrium for operating the valve of the drain-cock; a pair of normally closed conduits for connecting said cylinder with a supply of fluid under pressure; and a valve normally occupying a closed neutral position for alternately connecting one conduit with the supply of fluid under pressure and the other with an exhaust.

6. The combination with a cylinder drain-cock; of a supplemental cylinder; a wedge-shaped piston in the cylinder for operating the valve of the drain-cock; conduits for conducting fluid under pressure to the cylinder to actuate the wedge-shaped piston; means for controlling the passage of fluid under pressure through said conduits, and a handle fast to the wedge-shaped piston and extending through the cylinder to the exterior thereof.

7. The combination with the cylinder drain-cock of a locomotive; of a supplemental cylinder into which the stem of the drain-cock extends; a wedge-shaped piston in said cylinder directly engaging said stem, a pair of conduits connecting said cylinder with a supply of fluid under pressure and a normally closed valve accessible to the engineer for alternately connecting one conduit with the supply of fluid under pressure and the other with an exhaust.

8. The valve provided with a revoluble taper plug having two transverse ducts and two radial communicating ducts, the transverse ducts adapted to admit air or steam alternately to each end of the cylinder-valve chambers, to reciprocate the cylinder-valve plugs to open or close the cylinder-cocks; the said cylinder-valve chambers, the cylinder-valve plugs reciprocating therein, the cylinder-cocks in conjunction therewith, and the radial ducts adapted and arranged to receive air or steam from the chamber of the cylinder-valve as and for the purpose set forth.

9. In combination with a valve-plug provided with transverse and radial ducts adapted to simultaneously transmit air to one end of the cylinder-valve chamber and to receive it from the other end, the valve-body B provided with spurs to limit the semirotation of the operating-lever E, means to temporarily secure said lever to a central or normal position, the cylinder-valve chambers, the cylinder-valve plugs operating in said chambers, and the cylinder-cocks adapted when the said cylinder-valve plugs are actuated simultaneously to liberate the condensation in the steam-cylinders or to prevent the steam from escaping therefrom substantially as specified.

HENRY W. McCOMBS.

Witnesses:
JOSEPH T. BRENNAN,
ARTHUR F. RANDALL.